United States Patent [19]

Daly et al.

[11] Patent Number: 4,767,426

[45] Date of Patent: Aug. 30, 1988

[54] MEMBRANE FILTER TUBE AND METHOD OF PREPARATION

[75] Inventors: Robert Daly, Haverhill, Mass.; Paul E. Rebe, Derry, N.H.

[73] Assignee: Whatman Reeve Angel plc, Maidstone, England

[21] Appl. No.: 103,015

[22] Filed: Oct. 5, 1987

[51] Int. Cl.[4] .............................................. B01D 50/00
[52] U.S. Cl. ........................................ 55/487; 55/502; 55/524; 55/528; 55/498; 210/489; 210/497.01; 156/86
[58] Field of Search ................... 55/97, 158, 486, 487, 55/502, 498, 524, 527, 528; 210/315, 342, 497.01, 500.36, 488–493; 156/86

[56] References Cited

U.S. PATENT DOCUMENTS

| | | | |
|---|---|---|---|
| Re. 29,447 | 10/1977 | Farrow et al. | 210/232 |
| 2,966,960 | 1/1961 | Rochlin | 55/498 |
| 3,399,516 | 9/1968 | Hough et al. | 55/487 |
| 3,708,965 | 1/1973 | Domnick | 210/315 |
| 4,105,561 | 8/1978 | Domnick | 210/489 |
| 4,210,540 | 7/1980 | Perrotta | 210/497 R |
| 4,250,605 | 2/1981 | Chapman | 156/86 |
| 4,259,096 | 3/1981 | Nakamura et al. | 55/498 |
| 4,539,113 | 9/1985 | Tomita et al. | 210/500.36 |
| 4,680,118 | 7/1987 | Taga | 210/493.1 |
| 4,731,184 | 3/1988 | Ostreicher et al. | 210/450 |

FOREIGN PATENT DOCUMENTS

| | | | |
|---|---|---|---|
| 28602 | 3/1981 | Japan | 210/500.36 |
| 1521045 | 8/1978 | United Kingdom . | |

*Primary Examiner*—Bernard Nozick
*Attorney, Agent, or Firm*—Richard P. Crowley

[57] ABSTRACT

A membrane filter which comprises a porous, self-supporting, end axially-compressible filter tube, and a microporous membrane sheet bonded to the external surface of the filter tube, the membrane sheet overlapping the one and other ends of the filter tube and extending across the full edge width at the ends to provide a membrane filter to seal into a housing by axial compression without the need for gaskets, end caps or adhesives. A method of preparing a membrane filter tube, which method comprises securing a microporous membrane to the external surface of a self-supporting, axially compressible filter tube and overlapping and securing the ends of the membrane across the ends of the full edge width of the filter tube. A method of using a membrane filter which comprises sealing the membrane filter in a housing by axially compressing one or both ends of the membrane filter tube across the full edge width of the membrane by a surface housing to provide an effective seal at one or both ends without the need for end caps, gaskets or adhesives.

33 Claims, 2 Drawing Sheets

MEMBRANE FILTER TUBE AND METHOD OF PREPARATION

DESCRIPTION

Background of the Invention

There are a wide variety of filters employed for the filtration of gases and liquids. One specialty class of filters for the high efficiency filtration of gases, such as for the filtration of compressed air, filtering samples to analyze, filtering natural gas, removal of oil from vacuum pump exhaust, filtration of steam and ethylene oxide to sterilize, and particularly for the filtration of high purity or toxic and corrosive gases, generally comprises a cylindrical filter composed of finely divided fibers or a filter composed of a pleated membrane with an external support. Normally, pleated membranes operate with the flow direction from outside to inside, while, typically, glass fiber filter tubes operate with the flow direction from inside to outside.

The cylindrical filter comprises borosilicate glass fibers randomly disposed and then bonded together with a bonding agent, such as a fluorocarbon or other resin binder. The cylindrical filter tube is self-supporting and is axially compressible at the ends thereof to provide a sealing surface against the surface of a housing so that no gasket is required to effect an end seal. Cylindrical filter tubes of this type are described for example in U.S. Pat. No. 3,767,054, issued Oct. 23, 1973, hereby incorporated by reference in its entirety.

Other types of filters comprise membrane filter cartridges which are employed in filter housings with the filter cartridge constructed of a pleated membrane, such as nylon, an external support grid, such as one composed of a polypropylene, and end caps. Typically, such membrane filter cartridges require the use of gaskets, adhesives or potting resins to effect a seal within a housing. A pleated filter cartridge is described in U.S. Pat. No. 4,680,118, issued July 14, 1987 which filter cartridge provides for a pre-filter and a final filter. However, in all membrane filter cartridges, it is necessary to provide external supports, end caps and a sealing bond between the membrane and the end caps and between the end cap gaskets and the housing. While such sealing may be effective, in addition to the expense of this type of construction of these membrane filters, such sealing bond carries potential leak points. It is therefore desirable to provide a novel and unique membrane filter which eliminates the expense and problems associated with conventional membrane filter construction and avoids the use of gaskets, end caps and adhesive and potting resins to effect a desirable reliable seal.

SUMMARY OF THE INVENTION

The present invention concerns a membrane filter and the method of preparing and using such filter in a housing and filter system. In particular, the invention relates to a membrane filter which comprises in combination a filter tube composed of finely divided fibers with a bonding agent and a microporous membrane secured to the external surface of the filter tube and overlapping the full edge width at each end of the filter tube and to the method of preparation and use of such a membrane filter.

The membrane filter comprises an internal pre-filter tube which serves as a pre-filter and as support for the thin microporous membrane. The filter tube comprises in one embodiment a plurality of randomly disposed fibers, typically inorganic fibers, such as borosilicate glass, bonded together at the intersection of the fibers with a bonding agent to form a self-supporting cylindrical filter tube with the ends axially compressible and of defined thickness and defined filter capacity. The microporous membrane is secured, typically by bonding or heat-shrinking or both or other means, about the external surface of the cylindrical pre-filter filter tube with the membrane extending over the one and other ends of the pre-filter filter tube and across the full edge width at the one or the other ends of the filter tube, and also preferably extending slightly over and onto the internal surface of the pre-filter filter tube. The membrane filter may be employed for the filtration of fluids, but is primarily designed for the high efficiency filtration of gases, with the combination of the pre-filter and the membrane having much better filter characteristics than either the pre-filter composed of the bonded fibers or the microporous membrane alone. For example, comparative retention efficiencies for such a membrane filter would have the membrane filter having about a 0.2 micron rating (liquid) and the pre-filter having a 99.99% at 0.1 micron rating, while the combination of the pre-filter and the membrane provides for no detectable penetration of particles from a gas at 0.01 microns. Further, the unique pre-filter membrane filter combination greatly extends the life of the microporous membrane employed.

Also, and importantly, in all other membrane filter designs, it is necessary to provide internal-external supports, end caps and a bond between the membrane and gaskets between the end caps and the membrane filter housing. The membrane filter of the invention avoids the expense of this type of construction and provides for an effective seal in a membrane filter housing by axial compression without the need for gaskets, end caps, adhesive or other chemical bonding agents. The sealing of the membrane filter is accomplished by axial end compression of the membrane filter within a housing across the full edge width of the microporous membrane, which membrane extends across the full edge width of each end of the pre-filter filter so that each end of the tube is adapted to be compressed together into a reliable, self-sealing, self-gasketing relationship upon the application of an axial force between a pair of end flanges of the filter housing. The facing surface of the end flanges compress the fine fibers at the end of the pre-filter cylindrical filter tube through the end overlapping microporous membrane to provide a peripheral, fluid-tight seal between the facing surface and each end of the membrane filter.

The invention also comprises a method of preparing a membrane filter, which method comprises securing, such as by bonding or heat-shrinking or both, a thin, flexible, polymeric, microporous membrane sheet about and to and in a smooth-skin relationship with the external surface of an axially compressible, self-supporting, fibrous-bonded filter tube and overlapping and securing the ends of the microporous membrane sheet across and over the full edge width at each end of the filter tube to provide a membrane filter tube which may be sealed in a filter housing against the flat or substantially flat flange surface of the housing without the necessity for gaskets, potting compounds, adhesives or other mechanical or chemical sealing means.

The membrane filter tube comprises an internal, pre-filter filter tube which is a rigid or semirigid, cylindrical, porous filter tube, with the tube composed of a plurality of overlapping, randomly disposed, nonwoven fibers, the fibers having interstices therebetween to define the porosity of the pre-filter filter tube. The fibers contain at the junctions of the fiber crossovers a hardened binder material to provide a semirigid or rigid, self-supporting, cylindrical filter tube structure, with the binder material generally uniformly dispersed throughout the body of the filter tube. The fibers may be composed of a wide variety of materials and typically of either inorganic or organic materials, and more typically inorganic fibers of zirconia, alumina and more preferably of glass, such as borosilicate glass. The diameter of the fibers may vary, but fiber diameters ranging from about 0.01 to about 10 microns, for example 0.1 to 5 microns, are preferred in the pre-filter tube.

The binding agent employed may be either a polymeric binder or an inorganic binder, but typically is a chemically-resistant polymeric binder, such as for example, of epoxy resin, silicone resin, and preferably a flurocarbon-type resin, such as a polyvinylidene fluoride resin (see U.S. Pat. No. 4,210,540, issued July 1, 1980, hereby incorporated by reference). The pre-filter tubes are self-supporting, self-gasketing and are axially compressible at the ends thereof and sealed in place simply by compressing the ends of the tube against the opposing flat surfaces of a filter housing. The cylindrical pre-filter tube typically employs about 2% to 60% by weight of the resin binder, or more, typically about 20% to 45% by weight. The pre-filter tube is characterized having, on the application of an axial force across the full edge width of the tube to be sufficiently self-supporting and axially compressible to compress the fibers together, for example, 0.01 to 0.030 inches into a sealing relationship at each end of the tube within a filter tube housing. While randomly disposed fiber pre-filter tubes are one embodiment, any porous, self-supporting filter tube may be used as the pre-filter tube, which is characterized by the ends axially compressible so that the tube is self-gasketing against a surface, such as, but not limited to, string wound, woven or other filter tubes.

The membrane filter tube also comprises a thin, flexible, microporous membrane secured to and about the external surface of the pre-filter tube and across the full edge width of the tube at each end and extending preferably a short distance, e.g. one-sixteenth to one-quarter inch, to and over the internal surface of the pre-filter tube at each end. In one embodiment, the microporous membrane is secured to and about the surface of the pre-filter tube by heat-shrinking an elongated cylinder of the microporous membrane material about the pre-filter tube, and also preferably bonding the membrane by the employment of a small amount of thermoplastic polymeric material, such as a supporting scrim material, which is secured to the internal surface of microporous membrane.

Generally, the polymeric thermoplastic material is employed as a scrim-type material, for example, a mesh of one-eighth inch or less so that on heating the microporous membrane material of the cylindrical form about the pre-filter tube, the microporous membrane material heat shrinks into a secure, heat-shrunk relationship about the pre-filter tube surface and also is bonded into place through the melting and subsequent cooling of the thermoplastic polymeric scrim material. The microporous membrane is secured by both being heat-shrunk to fit closely the surface of the pre-filter tube and also by employment of a thermoplastic polymer into a snug, close fitting relationship about the external surface of the pre-filter tube and across the full edge width of the pre-filter tube at each end. Any adhesive-type material may be used to bond the internal surface of the microporous membrane material to the filter tube and separately be applied rather than as part of the membrane sheet, and where heat-shrinking is sufficient an adhesive for bonding purposes may be omitted.

The microporous membrane employed comprises a microporous material, such as a polymeric material containing usually a plurality of generally uniform micropores and which is suitable for use as a membrane material and which material includes, but is not limited to, a wide range of organic and inorganic materials which are capable of being heat-shrunk or bonded and which contain the desired pore structure. Such material would include, but not be limited to: an organic, polymeric material, such as fluorocarbon polymers, like vinyldene fluoride polymers and polyfluoroethylene-type polymers, such as tetrofluoroethylene (Teflon ®); olefinic polymers, such as polyethylene, polypropylene and copolymers of ethylene and propylene; polyamides, like nylon; and other materials capable of being used as a membrane, particularly in thin, flexible sheet form, and particularly, in one embodiment, heat or radiation shrinkage microporous polymers. Generally the pore size of the microporous membrane material may vary as desired, but typically ranges up to about 10 microns or less, for example, 2 microns or less, for example, 0.1 to 1 micron, with the micropores usually uniformly disposed throughout the polymer material and of generally uniform size. The pores of the microporous material may be formed in a variety of different manners, and for example, may comprise a supported, i.e. reinforced, or non-supported, single or composite Teflon ® (a registered trademark of E. I. Du Pont de Nemours & Co.) sheet material wherein the micropores are formed by the rapid stretching of the Teflon ® sheet material, solvent etching or other pore forming technique to provide a fluorocarbon membrane with a desired liquid rating pore size. Typically, the microporous membrane material should be capable of being formed in cylindrical form, such as in flexible sheet form, which may be cut and formed into a cylinder for insertion over the pre-filter tube prior to being heat shrunk or bonded.

In one preferred embodiment, the thin microporous membrane material comprises a membrane sheet which contains on one side of the sheet a reinforcing material, such as a thermoplastic polymeric scrim material, typically in mesh form, of a thermoplastic material which will melt or soften when the membrane material is heat-shrunk or otherwise heated to provide a means to bond the interior surface of the membrane sheet material to the exterior surface of the pre-filter tube through the melting/softening and subsequent solidification of the thermoplastic polymeric scrim material. For example, the membrane material may comprise a Teflon ® membrane sheet material, known as Gortex ® (a registered trademark of W. L. Gore and Associates, Inc.) material, containing on one surface a polymeric scrim composed of a polypropylene resin which has a melting point of approximately of 275° F. to 325° F. and which membrane sheet material is subject to heat-shrinking at a temperature generally above 300° F., for example 350° F. to 450° F., when placed in a hot air oven, such as a tunnel shrink oven, for a defined or dwell shrinkage time. The microprous membrane often is quite flexible and thin, such as 0.5 to 5 mils, e.g. 0.5 to 2 mils, so that an open supporting or reinforcing material is used for bonding, such as mesh, woven or non-woven fabric, scrim, such as a glass fiber scrim, etc.

The membrane filter is prepared by forming a cylinder of the microporous membrane sheet material of defined size so that the membrane forms a close, loosely fitting cylinder over the pre-filter tube and which extends in length beyond the ends of the pre-filter tube and of sufficient length so as to enable the ends to be heat-shrunk and extend over the full edge width of the pre-filter tube, and preferably also a very short distance into the interior of the tube about each end. The microporous membrane cylinder used should be loosely fitted over the pre-filter tube, sufficiently such that on heat-shrinking the polymeric scrim material melts to form a bond and the microporous membrane material heat shrinks into a close fitting, snug relationship with the cylindrical exterior surface of the pre-filter tube.

In one embodiment, a microporous membrane material is prepared in sheet form and then formed into a cylinder with slightly overlapping sheet edges, for example by the use of adhesives, or more particularly, by the use of ultrasonic energy, to make a microporous membrane cylinder or sleeve with the overlapping edges bonded by the thermoplastic polymeric scrim material. In one use, the microporous membrane sleeve so prepared for example may have a length of four inches and an internal diameter of approximately one and one-quarter inches so that it may be placed over a pre-filter tube of a length of two and one-half inches and an inside diameter of one inch and having a one-eighth inch wall thickness with such arrangement providing for a one-eighth inch extension of the ends of the sleeve into the interior surface of the pre-filter tube and to provide a heat shrinkage factor for reduction in length on heat-shrinking.

In preparation, the microporous membrane sleeve is slipped over the pre-filter tube, then the pre-filter tube and the microporous sleeve are exposed to heat or other means to shrink the membrane, such as for example in a heat-shrink, tunnel-type oven, at a heat-shrinking temperature of, for example, 300° F. to 450° F., to heat-shrink the Teflon ® microporous membrane and to melt the polymeric scrim material used as an adhesive on the internal surface for a defined length of time so that the microporous membrane heat shrinks and snugly and smoothly fits about the external surface of the pre-filter tube. On such heat-shrinking, the ends of the sleeve become slightly wrapped and extended toward the tube axis and around the ends of the pre-filter tube. The ends of the microporous membrane sleeves are then caused to conform to and across the full edge width of the pre-filter tube and slightly into the interior of the pre-filter tube, such as by the employment of a smooth, heated surface to smooth and bond the microporous membrane to each end of the pre-filter tube and to the interior wall of the pre-filter tube at each end. In one embodiment, a heated metal die having a flat flange surface to contact the filter edge and inner cylinder of slightly less diameter than the internal diameter of the filter tube may be used.

The microporous membrane filter tube so prepared thus has overlapping ends of the microporous membrane with the microporous membrane smoothly bonded to the exterior surface of the pre-filter tube in a close fitting relationship and which permits the membrane pre-filter tube to then be inserted into a filter housing, and the integral microporous membrane and pre-filter tube sealed into the housing by axial compression of the ends of the membrane filter.

The resulting membrane filter tube permits the glass fiber pre-filter tube to act as a pre-filter and the microporous membrane to act as a final filter, the combination of the pre-filter and the microporous membrane providing for unexpectedly long membrane filter tube life and to obtain surprising and unexpected retention efficiencies of from, for example, 0.008 to 2 microns. Of course, if desired, there may be one or more pre-filter tubes. It has been found that the combination of borosilicate glass fiber filter tubes with a stretched Teflon ®, Gortex ®-type membrane having pores with a filter rating of, for example, 25% or less than the filter tube provide for a combined retention efficiency of no detectable penetration and unexpected low micron particles in a gas stream. The membrane filter provides for unique construction, unexpected retention and life expectancy features and avoids the expense of construction of external support, end caps, gaskets and adhesives. The membrane filter tube is suitable for use in the filtration of a wide variety of fluids, and particularly for toxic and corrosive-type gases due to the chemical-resistant nature of a flurocarbon resin binder in the pre-filter tube and a flurocarbon microporous membrane employed with the borosilicate glass fiber filter tube, for example, arsine, borsine, silane and other gases associated with computer and microchip manufacture.

The membrane filter tube will be described for the purposes of illustration in connection with particular embodiments; however, it is recognized that various changes, modifications, additions and improvements may be made to the illustrated embodiments without departing from the spirit and scope of the invention as illustrated.

DESCRIPTION OF THE EMBODIMENTS

Figure 1:
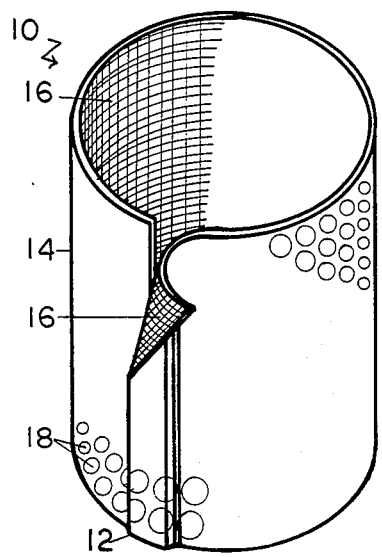
FIGS. 1–4 are schematic, illustrative, perspective views of the steps of a method of preparing the membrane filter of the invention.

FIG. 1 shows a cylindrical microporous membrane sleeve 10 having a supported seam 12 formed by the overlapping of the edges of a Gortex ® (Gortex ®#L12005) microporous membraneسheet material. The membrane 14 comprises a Teflon ®-stretched material of about 1 mil in thickness with uniformly disposed micropores 18 of generally uniform size (about 0.45 microns liquid rating) and having a reinforcing polymeric scrim material composed of a mesh-like polypropylene 16. The microporous membrane sleeve 10 is formed by overlapping the material to the defined diameter of the sleeve and adhesively bonding the overlapped edges, such as for example by ultrasonically welding or heating the overlapping edges to use the polymeric polypropylene scrim material 16 as an adhesive material.

Figure 2:
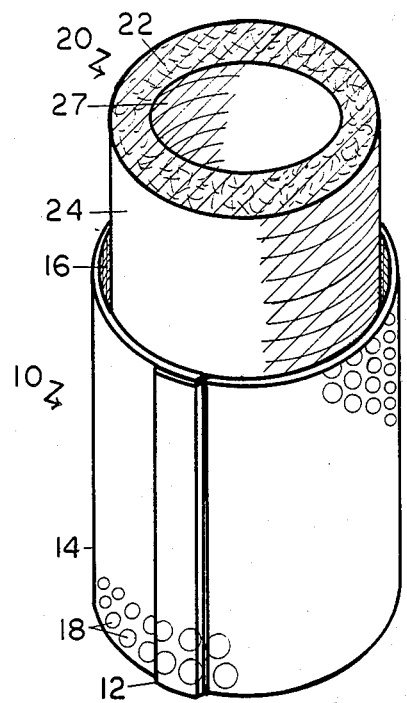

FIG. 2 shows the sleeve 10 in a partial position about and over a borosilicate glass fiber, fluorocarbon resin-bonded filter tube 20 having an edge width 22 and an exterior surface 24. The microporous membrane sleeve 10 is in a slidable, close fitting relationship over the exterior surface 24 of the filter tube 20 and is placed in position so that the microporous membrane sleeve 10 covers the full exterior surface of the filter tube 20 and with the ends slightly extending beyond the length of the filter tube 20. The filter tube 20 may for example be a Balston ® Grade B filter tube (Balston ® is a registered trademark of Balston, Inc. of Lexington, Mass.) characterized by being self-supporting and self-gasketing by axially compressing the ends thereof.

Figure 3:
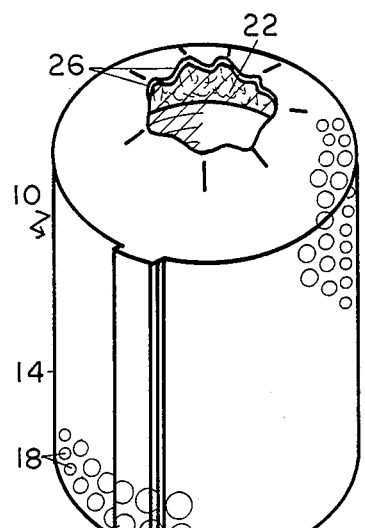

FIG. 3 shows the filter tube 20 and the sleeve 10 after being heated to a temperature of approximately 350° F. to 450° F. in a tunnel-type oven with a delay or dwell time sufficient to permit the microporous membrane material 14 to heat-shrink into a close, tight fitting relationship against the exterior surface 24 of the filter tube 20 with each end of the microporous sleeve 10 wrapped loosely about in a heat-shrunk, wrinkled condition around the edge 22 of the filter tube 20. In the embodiment described, the heating to heat-shrink the membrane material 14 also is sufficient to melt the polypropylene scrim 16 so as to permit the melted scrim polymer on cooling to act as a solid adhesive to bond the microporous membrane material 14 into a tight, adhesive, smooth relationship with exterior surface 24.

Figure 4:
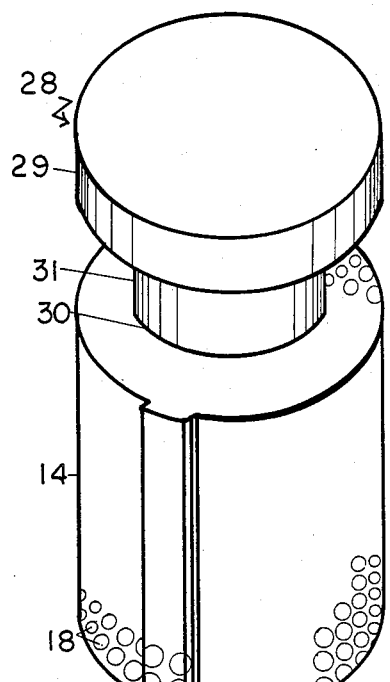
Figure 5:
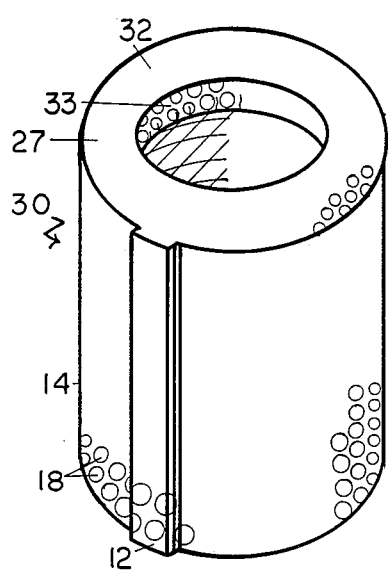
FIG. 5 is an illustrative, schematic, perspective view of the membrane filter tube of the invention.

FIG. 4 shows a heated metal die 28, heated for example to about 350° F. to 400° F. The die is composed of an outwardly flanged end 29 with a cylinder extension 31 having an outer diameter about the inner diameter 30 of the filter tube. The die is briefly inserted at one end into the inside diameter of the filter tube 20 to cause the ends 26 of the microporous membrane 14 to conform to the ends of the filter tube 20. The heated die 28, with one smooth flange surface, forces the ends of the membrane material 14 into a close fitting relationship across the full edge width 22 of the filter tube 20 and also causes the polymeric scrim to adhere to the ends of the filter tube at each end and also to force the slight overlapping of the ends of the microporous membrane 14 into and against the interior surface 27 of the filter tube 20 and over the end 32 as shown in FIG. 5. The microporous membrane against the interior surface of the filter tube 33 is slightly edge wrinkled but firmly bonded against the interior surface 27 of the filter tube 20. As illustrated in FIG. 4, the heated die as shown has been inserted in one end; however, the heated die is also inserted in the other end to form a complete membrane filter.

A membrane filter tube of the invention as described in FIGS. 1-4 is illustrated in FIG. 5 wherein the membrane tube 30 shows the microporous membrane overlapping the ends 32 of the filter tube 20 to allow axial compression which effects a seal against a flat surface with the microporous membrane 14, heat-shrunk and bonded to the exterior surface 24 of the filter tube 20.

Figure 6:
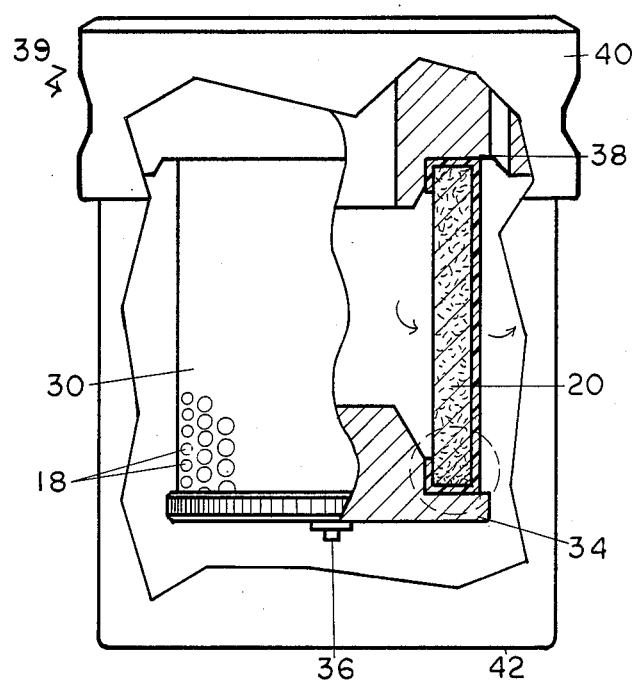
FIG. 6 is a schematic partially sectional view of the membrane filter tube of FIG. 5 sealed within a filter housing.
Figure 7:
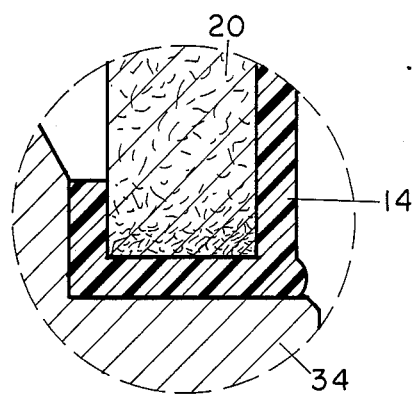
FIG. 7 is an enlarged, fragmentary view of a portion of the filter housing of FIG. 6.

FIG. 6 is an illustrated, partial sectional view of a filter housing 39 which includes a filter head 40, a filter bowl 42, such as a clear, transparent bowl, secured to the filter head 40, typically by threads, and an upper 38 and lower 34 housing having a flat surface between which is disposed a filter tube 30, a lower housing surface illustrated as 34, the housing surface 34 adapted to axially compress the membrane filter tube 30 through the employment of a tie rod 36, to cause axial compression against the two housing surfaces 34 and 38. As illustrated by the flow arrows, the flow in the filter housing is from inside to outside, through the wall of the pre-filter tube 20 and then through the surrounding microporous membrane micropores 18. The sealing is shown more particularly in the enlarged, fragmentary view of FIG. 7 wherein the membrane filter tube 30 is sealed by axial compression of the end of the membrane filter tube 30 against the flat surface of the housing 34. The self-gasketing eliminates the requirements for adhesives, gaskets and potting compounds. Thus, the membrane filter tube provides for a unique technique of sealing the filter tube wherein the membrane extends across the face edge of a compressible filter tube with the microporous membrane having the smallest or finest pore size forming a seal against the face edge between the housing and the compressible filter tube.

As described and illustrated, the membrane filter tube is unique and has many advantages that may be employed directly in conventional filter tubes and housings wherein borosilicate glass fiber, resin-bonded filter tubes are employed.

What is claimed is:

1. A membrane filter which membrane filter comprises in combination:
   (a) a cylindrical porous prefilter tube for the filtration of fluids having an exterior and an interior surface and having a one and an other end and of defined edge thickness at the one and other end, the filter tube being a self-supporting, end axially-compressible, self-gasketing filter tube; and
   (b) a microporous cylindrical membrane in a close fitting, snug, secure relationship about the exterior surface of the filter tube and across the full edge width of the filter tube, at each end of the filter tube, to provide a membrane filter which is capable of sealing against a housing surface by axial compression across the edge width containing the microporous membrane.

2. The filter of claim 1 wherein the microporous membrane comprises a flurocarbon membrane.

3. The filter of claim 1 wherein the microporous membrane has pores ranging from about 0.01 to 2 microns.

4. The filter of claim 1 wherein the microporous membrane is adhesively bonded to the exterior surface of the filter tube.

5. The filter of claim 1 wherein the microporous membrane comprises a heat-shrunk microporous membrane.

6. The filter of claim 1 wherein the microporous membrane includes a bonded, overlapping seam extending generally longitudinally to the axis of the filter tube.

7. A filter system which includes a filter housing having opposing surfaces and the membrane filter of claim 1 disposed in the housing with the full edge width of the membrane filter tube disposed against the opposing surfaces and means to provide axial compression to the ends of the membrane filter to seal the membrane filter within the housing without the necessity for gasket material, adhesives or potting compounds.

8. The filter of claim 1 which filter has a retention efficiency of about 0.008 to 2 microns.

9. The filter of claim 1 wherein the microporous membrane extends slightly within and against the interior surface of the prefilter tube.

10. The filter of claim 1 wherein the microporous membrane comprises a thin, flexible microporous membrane having a thickness of 0.5 to 5 mils.

11. The filter of claim 1 wherein the prefilter tube comprises randomly disposed, non-woven, borosilicate glass fibers having a diameter of from about 0.01 to 10 microns and the fibers bonded together with a bonding agent.

12. The filter of claim 11 wherein the bonding agent comprises a fluorocarbon polymer.

13. The filter of claim 11 wherein the randomly disposed fibers comprise borosilicate glass fibers, the bonding agent comprises a fluorocarbon resin and the microporous membrane comprises a thin, fluorocarbon microporous membrane.

14. The filter of claim 1 which includes a reinforcing scrim material between the microporous membrane and the exterior surface of the filter tube.

15. The filter of claim 14 wherein the reinforcing scrim material comprises a thermoplastic polymer.

16. The filter of claim 1 wherein the microporous membrane comprises a thin, heat-shrunk, fluorocarbon microporous membrane having thermoplastic polymeric scrim material on the interior surface thereof, the thermoplastic scrim material bonding the microporous membrane to the exterior surface of the filter tube.

17. The filter of claim 16 wherein the thermoplastic membrane comprises a polypropylene, mesh-type scrim material.

18. A membrane filter which comprises:
(a) a cylindrical prefilter tube for the filtration of gases and having an exterior and an interior surface and one and an other end and of a defined edge thickness at the one and other end, the filter tube comprising a plurality of nonwoven, randomly disposed, borosilicate glass fibers having a diameter of about 0.01 to 10 microns, the borosilicate glass fibers bonded together with fluorocarbon bonding agent to form a self-supporting, end axially-compressible, self-gasketing filter tube of defined filter capacity and efficiency; and
(b) a heat-shrunken fluorocarbon, microporous membrane bonded by a thermoplastic polymer into a close fitting, snug, secure relationship about the exterior surface of the filter tube and across the full edge width of the filter tube at each end of the filter tube and extending slightly within and against the interior surface of the filter tube at each end to provide a membrane filter subject to sealing against a housing surface by end axial compression across the full edge width of the microporous membrane.

19. A filter system which includes a filter housing which includes the membrane filter tube of claim 18 disposed within the housing and each end of the filter tube axially compressed to form a self-gasketing seal within the housing.

20. A method of preparing a microporous membrane filter to be sealed within a filter tube housing by axial compression of the end of the membrane filter and which method comprises:
(a) securing a polymeric microporous membrane material to the external cylindrical surface of an end axially compressible, self-gasketing, porous prefilter tube and which filter tube has a one and an other end and a defined thickness; and
(b) overlapping and securing the ends of said microporous membrane across the full edge width of the one and other ends of the filter tube.

21. The method of claim 20 which comprises employing a polymeric microporous membrane having a reinforcing scrim material on one side thereof.

22. The method of claim 20 wherein the polymeric microporous membrane comprises a thin, fluorocarbon membrane having micropores ranging from about 0.1 to 2 microns.

23. The method of claim 20 which comprises employing a polymeric, heat-shrinkable, microporous membrane comprising a thin, fluorocarbon resin and containing a reinforcing thermoplastic scrim material on one side and which includes heating the reinforced, fluorocarbon membrane material to heat shrink the microporous membrane material to the external surface of the prefilter tube and to bond the membrane material to the external surface with the thermoplastic scrim material.

24. The method of claim 20 wherein the prefilter tube comprises a plurality of borosilicate glass fibers bonded together with the fluorocarbon bonding agent and wherein the glass fibers have a diameter of from about 0.01 to 10 microns.

25. The method of claim 20 which includes forming a cylinder of the microporous membrane material from a sheet of microporous membrane material by bonding the slightly overlapping edges of the sheet material; placing the cylinder over the prefilter tube; heating the cylinder to heat shrink the cylinder of microporous material onto the external surface of the prefilter tube; and securing the microporous material of the cylinder across the full edge width of the prefilter tube.

26. The method of claim 20 wherein the heated die comprises a first and second metal cylinder, the first cylinder having a diameter the same as or greater than the outside diameter of the membrane filter, and the second cylinder, axially extending from the first cylinder, having an outer diameter about the same or slightly less than the inner diameter of the membrane filter and which includes inserting the second cylinder portion of the heated die into the interior of the membrane filter to press the microporous membrane extending over the edge width against the interior surface of the prefilter tube and to have the surface between the first and second cylinder press the microporous membrane against and across the full edge width of the prefilter tube.

27. The method of claim 20 wherein the microporous membrane comprises a heat-shrinkable polytetrofluoroethylene polymer.

28. The membrane filter produced by the method of claim 20.

29. The method of claim 20 which includes heat-shrinking a cylinder of the microporous membrane into a close, secure relationship with the external surface of the prefilter tube.

30. The method of claim 29 wherein the microporous membrane material comprises a thin, flexible, fluorocarbon, polymeric material having a thickness of 0.5 to 5 mils.

31. The method of claim 20 which includes:
(a) inserting a cylindrical sleeve of membrane material over the prefilter tube, the sleeve having a length of at least the length of the filter tube and twice the edge width of the prefilter tube;
(b) heating the sleeve of membrane material about the prefilter tube to heat-shrink the membrane material into a secure, close relationship with the external surface of the prefilter tube and generally over each end of the prefilter tube, and;
(c) inserting a heated die into each end of the prefilter tube to secure the overlapping ends of the heat-shrunk membrane material across the full edge width of the prefilter tube.

32. The method of claim 31 which includes employing a sleeve of membrane material of sufficient length so that the sleeve overlaps both the full edge widths of each end of the prefilter tube and on insertion of the heated die, extends slightly into and about the interior surface of the prefilter tube at each end.

33. The membrane filter produced by the method of claim 31.

* * * * *

UNITED STATES PATENT AND TRADEMARK OFFICE
CERTIFICATE OF CORRECTION

PATENT NO. : 4,767,426

DATED : August 30, 1988

INVENTOR(S) : Robert Daly et al.

It is certified that error appears in the above-identified patent and that said Letters Patent is hereby corrected as shown below:

Column 10, line 27, "claim 20" should read -- claim 31 --.

Column 10, line 42, "polytetrofluoro-" should read -- polytetrafluoro---.

Signed and Sealed this

Third Day of January, 1989

Attest:

DONALD J. QUIGG

*Attesting Officer*         *Commissioner of Patents and Trademarks*